United States Patent
Bang et al.

(10) Patent No.: US 8,275,053 B2
(45) Date of Patent: Sep. 25, 2012

(54) APPARATUS AND METHOD OF ESTIMATING CHANNEL BASED ON CHANNEL DELAY SPREAD IN MOBILE COMMUNICATION SYSTEM

(75) Inventors: Young-Jo Bang, Daejeon (KR); Kyung-Yeol Sohn, Daejeon (KR); Youn-Ok Park, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 1058 days.

(21) Appl. No.: 11/931,188

(22) Filed: Oct. 31, 2007

(65) Prior Publication Data

US 2008/0137788 A1 Jun. 12, 2008

(30) Foreign Application Priority Data

Dec. 8, 2006 (KR) .................. 10-2006-0124584

(51) Int. Cl.
*H04L 27/28* (2006.01)
(52) U.S. Cl. ..................... 375/260; 375/230
(58) Field of Classification Search .............. 375/260, 375/267, 316, 229, 230
See application file for complete search history.

(56) References Cited

U.S. PATENT DOCUMENTS

| | | | |
|---|---|---|---|
| 6,288,674 B1 * | 9/2001 | Sengupta et al. | 342/418 |
| 6,650,912 B2 * | 11/2003 | Chen et al. | 455/574 |
| 7,039,001 B2 | 5/2006 | Krishnan et al. | |
| 2003/0072254 A1 * | 4/2003 | Ma et al. | 370/208 |
| 2006/0109919 A1 * | 5/2006 | Nieto | 375/260 |

FOREIGN PATENT DOCUMENTS

| | | |
|---|---|---|
| KR | 1020030014078 A | 2/2003 |
| KR | 1020030097093 A | 12/2003 |
| KR | 1020060001646 A | 1/2006 |

OTHER PUBLICATIONS

Ove Edfors et al., "OFDM Channel Estimation by Sigular Value Decomposition", IEEE Transactions on Communications, vol. 46, No. 7, Jul. 1998.

* cited by examiner

*Primary Examiner* — David B. Lugo
(74) *Attorney, Agent, or Firm* — Jefferson IP Law, LLP (57) ABSTRACT

The present invention relates to an apparatus and method of estimating a channel based on a channel delay spread in a mobile communication system. Pilot subcarriers are inserted between data subcarriers at predetermined intervals to estimate a channel at locations of the pilot subcarriers. An approximate channel delay spread value is estimated by using an autocorrelation value of a pilot signal. Then, a channel for data subcarriers between the pilot subcarriers is estimated by using a Wiener finite impulse response (FIR) filter that has a separate coefficient according to the estimated delay spread value. Accordingly, by changing the Wiener FIR filter coefficient according to the delay spread value of the channel, it is possible to estimate the channel so as to be adaptive for a change of the channel over time. Since the filter coefficients, which are calculated in advance, are used, it is possible to reduce the amount of calculation required when calculating the filter coefficients. As a result, an apparatus for estimating a channel can be easily achieved.

9 Claims, 6 Drawing Sheets

FIG.5

APPARATUS AND METHOD OF ESTIMATING CHANNEL BASED ON CHANNEL DELAY SPREAD IN MOBILE COMMUNICATION SYSTEM

CROSS-REFERENCE TO RELATED APPLICATION

This application claims priority to and the benefit of Korean Patent Application No. 10-2006-0124584 filed in the Korean Intellectual Property Office on Dec. 8, 2006, the entire contents of which are incorporated herein by reference.

BACKGROUND OF THE INVENTION (a) Field of the Invention

The present invention relates to a mobile communication system, and more particularly, to an apparatus and method of estimating a channel based on a channel delay spread.

(b) Description of the Related Art

In a wireless environment, a channel is subjected to multipath fading due to ambient obstacles and a Doppler shift due to a speed of a moving body. Here, multipath fading means that electromagnetic waves are synthesized in a state where phases of the electromagnetic waves are different from each other due to multiple reflections and are received. The Doppler shift means that the environment is changed to a fast fading environment where the intensity of an electric wave temporally quickly varies when moving at a high speed, and a frequency shift due to a Doppler effect becomes severe in terms of a frequency. In this case, delay spread due to the multipath causes frequency selective fading, and when the delay spread increases, a channel correlation between subcarriers decreases. This means that channels between the subcarriers vary on a large scale.

Therefore, in order to securely estimate a channel that corresponds to a large delay spread, a method is used in which pilot subcarriers are arranged simply. However, if this method is used, a data transmission rate decreases. Further, in order to estimate the channel, it is required to perform an inverse matrix operation that is very complicated. As a result, it becomes difficult to implement an apparatus for estimating a channel.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method of estimating a channel, having advantages of accurately estimating a channel while reducing the amount of calculation.

An exemplary embodiment of the present invention provides an apparatus for estimating a channel based on a channel delay spread. The apparatus includes an FFT converter, a channel estimating unit, and a signal correcting unit. The FFT converter performs a Fourier transform on signals where distortion has occurred a channel estimating unit that estimates delay spread values for a plurality of channel estimation values corresponding to pilot signals extracted from the signal on which the Fourier transform is performed, and outputs a channel estimation value of the entire symbol for the signals where the distortion has occurred by using filter coefficients that are calculated in advance to correspond to the estimated delay spread values and the channel estimation values estimated for the pilot signals. The signal correcting unit compensates for the distortion of the signals on the basis of the channel estimation values, which are estimated for the signals where the distortion has occurred, and outputs the signals The channel estimating unit may include a pilot extracting module that receives the signals on which the Fourier transform has been performed and extracts the pilot signals from the signals, a channel estimating module that outputs the column of the channel estimation values for the extracted pilot signals, a delay spread estimating module that estimates delay spread values on the basis of the column of channel estimation values and outputs the delay spread values, a filter coefficient selecting module that selects the filter coefficients that are calculated in advance on the basis of the delay spread values, and a filter module that collects a plurality of channel estimation values on the basis of the output column of the channel estimation values and the selected filter coefficients and outputs the channel estimation value for the entire symbol.

Another embodiment of the present invention provides a method of estimating a channel based on a channel delay spread. The method includes receiving signals where distortion has occurred and extracting pilot signals from the received signals, estimating channel delay spread values from the pilot signals, and selecting filter coefficients calculated in advance on the basis of the estimated channel delay spread values and estimating channels of the signals where the distortion occurred on the basis of the selected filter coefficients and channel estimate values estimated with respect to the pilot signals.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" and "comprising", will be understood to imply the inclusion of stated elements but not the exclusion of any other elements.

Before describing an exemplary embodiment of the present invention, generally-used channel estimation will be described with reference to FIGS. 1 to 3. In particular, the description is first given of a least square (LS) estimator having a simple structure and a linear minimum mean square error (LMMSE) estimator having superior performance, among channel estimators that have been used, before a Wiener finite Impulse response (FIR) filtering estimator is introduced. As an exemplary embodiment, the description is given of the Wiener FIR filtering estimator that has a function similar to that of the LMMSE estimator but with a simpler structure than the LMMSE estimator.

Figure 1:
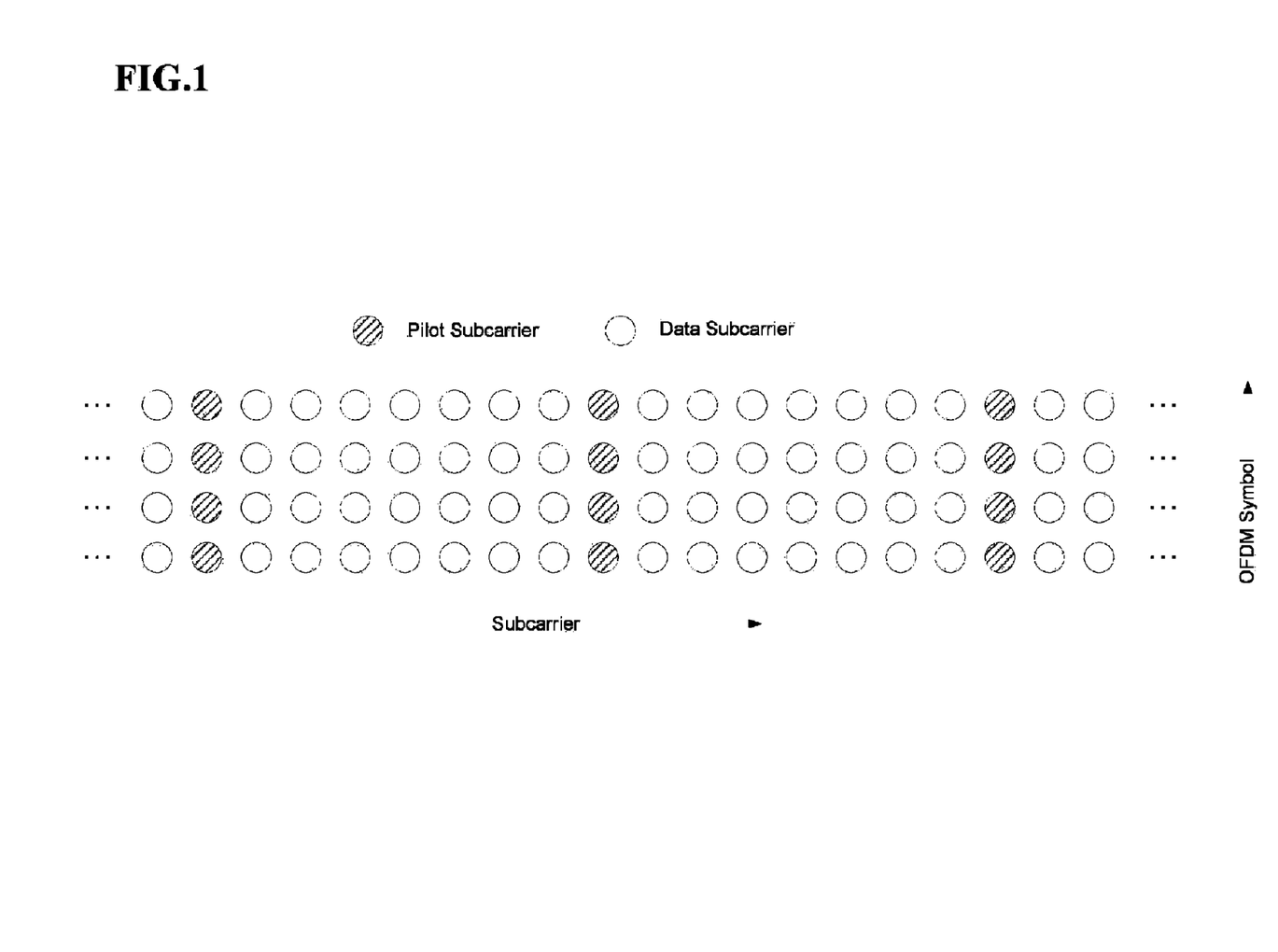
FIG. 1 is an exemplary view illustrating the disposition of pilots in a general frequency division multiple mobile communication system.

FIG. 1 is an exemplary view illustrating the disposition of pilots in a general mobile communication system. In this case, a structure of a general orthogonal frequency division multiplexing (OFDM) symbol, which is used when estimating a channel, will be exemplified.

In order to estimate a channel of a subcarrier where a pilot exists, the LS estimator estimates the channel as represented by Equation 1.

$$\hat{H}_{p,LS} = X_p^{-1} Y_p \quad \text{(Equation 1)}$$
$$= \left[ \frac{Y(0)}{X(0)}, \frac{Y(L)}{X(L)}, \frac{Y(2L)}{X(2L)}, \ldots, \frac{Y(N_p L)}{X(N_p L)} \right]^T$$

Here, $X_p$ denotes a transmitted pilot vector, $Y_p$ denotes a received pilot vector, L denotes an interval between pilot subcarriers, and $N_p$ denotes the total number of pilot subcarriers.

By using a channel estimation value estimated by the LS estimator as represented by Equation 1, a channel of a data subcarrier is estimated as represented by Equation 2.

$$\hat{H}_{LS}(k) = \left(1 - \frac{k}{L}\right)\hat{H}_{p,LS}(mL) + \left(\frac{k}{L}\right)\hat{H}_{p,LS}((m+1)L), \quad \text{(Equation 2)}$$

for $$mL \leq k < (m+1)L$$

The LS estimator has a simple structure, but does not have a superior channel estimation performance. In order to solve this problem, the LMMSE estimator has been suggested, which is superior to the LS estimator, even though the LMMSE estimator has a more complicated structure than the LS estimator.

The LMMSE estimator estimates the channel as represented by Equation 3.

$$\hat{H}_{LMMSE} = \left\{ R_{H\hat{H}_{p,LS}} \left( R_{H_p H_p} + \frac{1}{SNR} I \right)^{-1} \right\} \hat{H}_{p,LS} \quad \text{(Equation 3)}$$

Here, $R_{H\hat{H}_{p,LS}}$ denotes a cross-correlation function between an actual channel H and an LS channel estimation $\hat{H}_{p,LS}$ of a pilot, and $R_{H_p H_p}$ denotes an auto-correlation function of an actual channel $\hat{H}_p$ in the pilot.

Thus, if pilots for N subcarriers are $N_p$, $\hat{H}_{LMMSE}$ becomes an N×1 vector, $R_{H\hat{H}_{p,LS}}$ becomes an N×$N_p$ matrix, $(\cdot)^{-1}$ becomes Np×Np, and $\hat{H}_{p,LS}$ becomes $N_p$×1. Further, [•] indicates an interpolation matrix. However, if the interpolation matrix is calculated every time, the amount of calculation is increased. As a result, it is not possible to implement the hardware.

It has proposed a method in which an interpolation matrix is calculated in advance and stored in a look-up table (LUT). At this time, it is assumed that the Doppler shift can be ignored and has a random characteristic in which a distribution of delay time and the amount of power of each multipath is uniform in a delay spread value of a channel. In the method, the channel is estimated using the following Equations 4 and 5.

$$R_{HH} = E\{HH^H\} = [r_{m,n}] \quad \text{(Equation 4)}$$

$$r_{m,n} = \begin{cases} 1 & \text{if } m = n \\ \dfrac{1 - e^{-j2\pi L_{max}\frac{m-n}{N}}}{j2\pi L_{max}\frac{m-n}{N}}, & \text{if } m \neq n \end{cases} \quad \text{(Equation 5)}$$

Here, $r_{m,n}$ denotes a correlation between an m-th subcarrier channel and an n-th subcarrier channel, $L_{max}$ denotes a maximum delay spread value, and N denotes an FFT point.

However, when the channel is estimated by using the LMMSE estimator or the method, the interpolation matrix needs to be calculated every time. As a result, the amount of calculation is increased, which makes it difficult to implement hardware. A method that has been proposed to solve the above-described problem is a Wiener FIR filtering estimation method.

The Wiener FIR filtering estimator that uses the Wiener FIR filtering estimation method includes a Wiener interpolation filter that is implemented by a FIR filter having $N_{tap}$. As compared with the LMMSE method that uses all of the $N_p$ pilots, the Wiener FIR filtering method uses $N_{tap}$ pilots. Thus, it is possible to achieve a superior performance, while the amount of calculation is small.

In the Wiener FIR filtering method, the channel is estimated by using a sliding window that includes the $N_{tap}$ pilots over an entire band, and an intermediate portion of each sliding window is only estimated to thereby obtain the superior performance. A channel estimation location in the Wiener FIR filtering method will be described with reference to FIG. 2.

Figure 2:
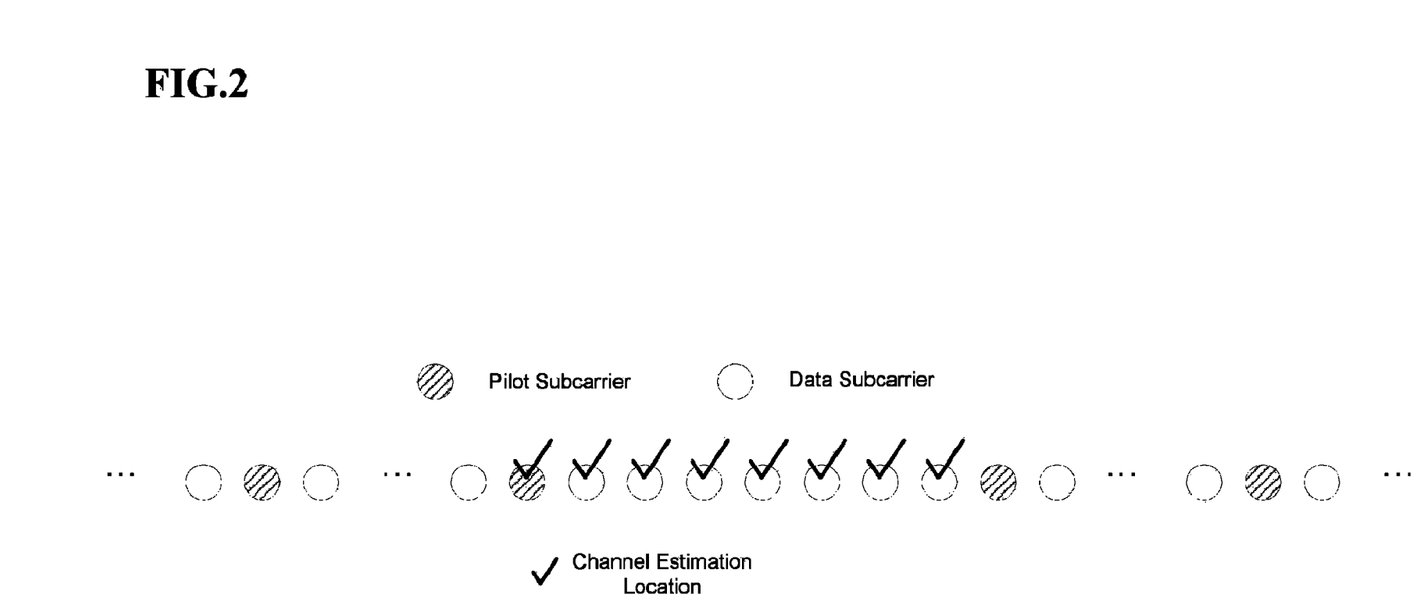
FIG. 2 is an exemplary view illustrating locations where pilots and channels are estimated when using a window including four pilots in a general OFDM symbol.

FIG. 2 is an exemplary view illustrating locations where pilots and channels are estimated when using a sliding window that includes four pilots in a general OFDM symbol.

As shown in FIG. 2, a channel estimation of the Wiener FIR filtering estimator for the n-th subcarrier is performed as represented by Equation 6.

$$\hat{H}(n) = W(n)\hat{H}_{p,LS}(n) \quad \text{(Equation 6)}$$

Here, $\hat{H}_{p,LS}(n)$ denotes an estimation channel vector of a pilot in a window that is used to obtain a channel estimation value for the n-th subcarrier, and W(n) denotes the Wiener filter coefficient that is used to perform channel estimation for the n-th subcarrier and is obtained from an MMSE. That is, W(n) is calculated by Equation 7.

$$W(n) = R_{H(n)\hat{H}_{p,LS}(n)} \left( R_{H_p(n) H_p(n)} + \frac{I}{SNR} \right)^{-1} \quad \text{(Equation 7)}$$

Here, $R_{H(n)\hat{H}_{p,LS(n)}}$, which is a $1 \times N_{tap}$ vector, denotes a cross-correlation function between H(n) and $\hat{H}_{p,LS(n)}$, and $R_{Hp(n)Hp(n)}$, which is an $N_{tap} \times N_{tap}$ matrix, denotes an autocorrelation function of an actual channel $H_p(n)$ in a pilot.

As such, the LMMSE estimator and the Wiener FIR filtering estimator can provide a channel estimation value, which is more accurate than that estimated by the LS estimator. However, when Equations 4 and 5 are calculated for a change in the channel, it is required to perform an inverse matrix operation that is very complicated.

Now, an average squared error in a general orthogonal frequency division multiplexing mobile communication system will be described with reference to FIG. 3. In this case, an orthogonal frequency division multiplexing mobile communication system where an FFT point is 1024 and a symbol rate is 10 MHz will be exemplified.

Figure 3:
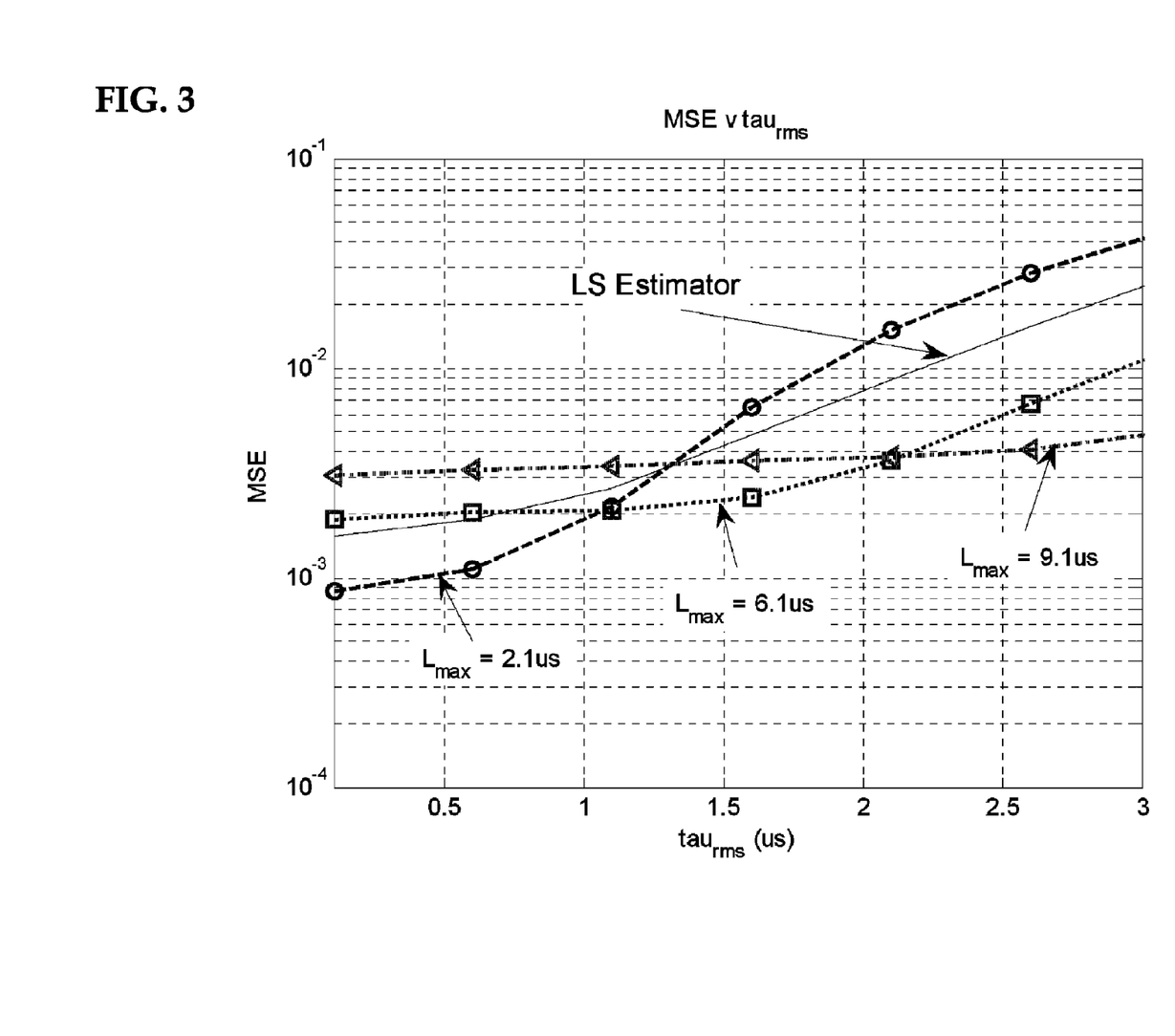
FIG. 3 is an exemplary view illustrating an average squared error according to an RMS local spread value of a general multipath fading channel.

FIG. 3 is an exemplary view illustrating an average squared error according to an RMS local spread value of a general multipath fading channel.

As shown in FIG. 3, a Wiener FIR filtering estimator is exemplified as a channel estimator. The Wiener FIR filtering estimator has a window ($N_{tap}$=4) in which a pilot interval is 8 and four pilots are included. The graphs show states when a signal-to-noise ratio (SNR) is 20 dB upon the conditions that maximum delay spread values $L_{max}$ are fixed to 2.1 us, 6.1 us, and 9 us, respectively. A filter coefficient according to a maximum delay spread value needs to be changed according to an RMS delay spread value of a channel. Further, if the inclination is not severe, even if an estimation step has been simplified, the performance is not affected.

On the basis of the above description, in the exemplary embodiment of the present invention, a method is suggested in which maximum delay spread values becoming candidate values are divided into three steps, in consideration of ambient environments and the radius of a cell in an orthogonal frequency division multiplexing mobile communication system, and a filter coefficient is calculated in advance. First, a structure of an apparatus for estimating a channel will be described with reference to FIG. 4.

Figure 4:
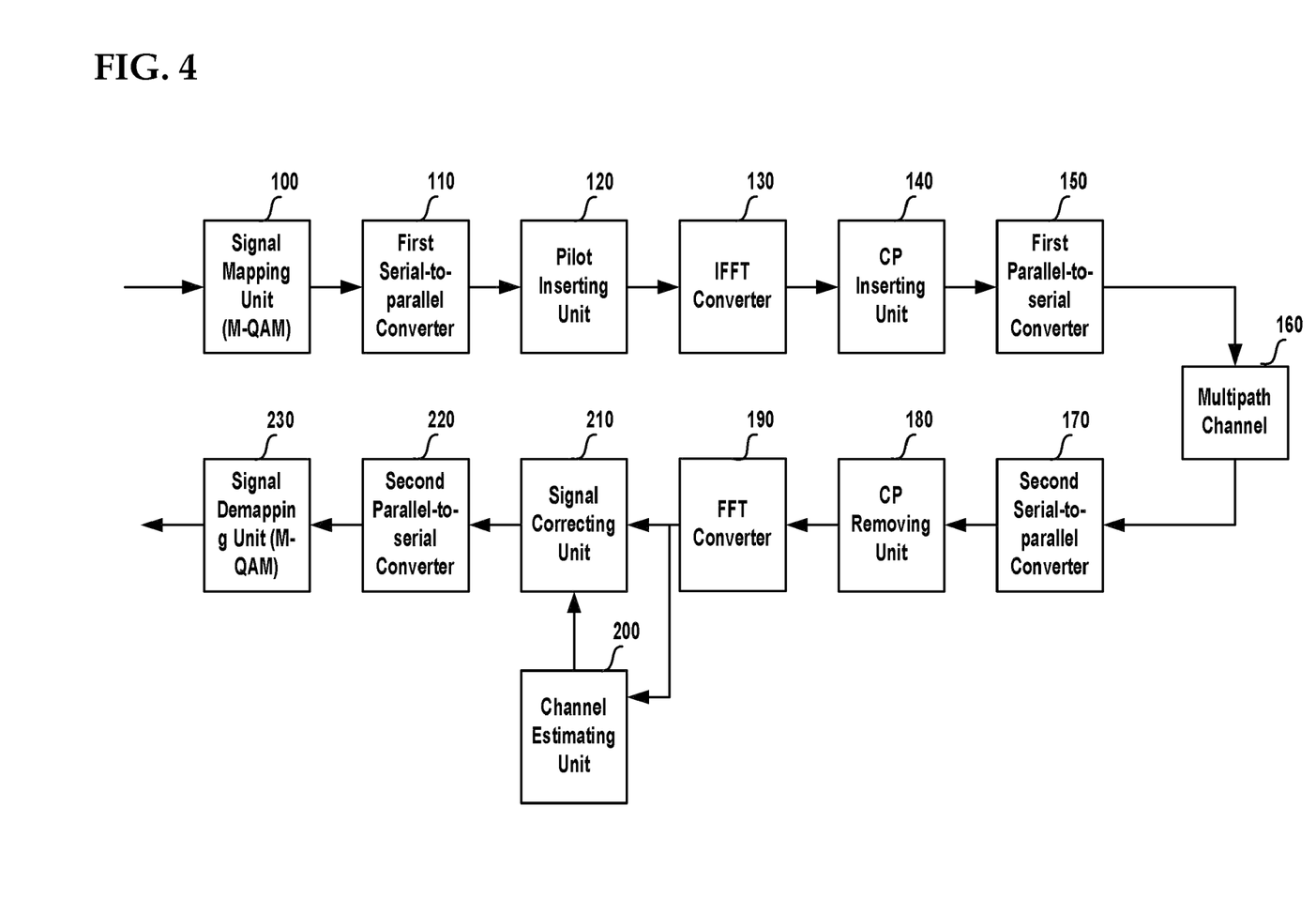
FIG. 4 is a configuration diagram illustrating an apparatus for estimating a channel according to an exemplary embodiment of the present invention.

FIG. 4 is a configuration diagram of an apparatus for estimating a channel according to an exemplary embodiment of the present invention.

As shown in FIG. 4, a transmitting terminal and a receiving terminal of the apparatus for estimating a channel are connected through a multipath channel 160. The transmitting terminal includes a signal mapping unit 100, a first serial-to-parallel converter 110, a pilot inserting unit 120, an IFFT converter 130, a cyclic prefix (CP) inserting unit 140, and a first parallel-to-serial converter 150. The receiving terminal includes a second serial-to-parallel converter 170, a CP removing unit 180, an FFT converter 190, a signal correcting unit 210, a channel estimating unit 200, a second parallel-to-serial converter 220, and a signal demapping unit 230.

Each constituent element will be described in detail. First, the transmitting terminal includes the signal mapping unit 100, the first serial-to-parallel converter 110, and the pilot inserting unit 120. In this case, the signal mapping unit 100 maps an input data signal in the form of a complex transmission symbol, and the first serial-to-parallel converter 110 allocates the mapped signal to each subcarrier channel. The pilot inserting unit 120 inputs a pilot signal to a location, which is already recognized by the receiving terminal, to perform channel estimation for some of the subcarrier channels. The transmitting terminal further includes the IFFT converter 130, the CP inserting unit 140, and the first parallel-to-serial converter 150. The IFFT converter 130 converts OFDM signals of a frequency domain including a pilot signal into OFDM signals of a time domain. The CP inserting unit 140 inserts a CP into transmission signals having been converted into the OFDM signals of the time domain. The first parallel-to-serial converter 150 sequentially transmits the transmission signals where the CP is inserted over time.

The receiving terminal further includes the second serial-to-parallel converter 170, the CP removing unit 180, and the FFT converter 190. The second serial-to-parallel converter 170 selects blocks corresponding to the wavelengths of the OFDM signals, among signals that are sequentially input over time after being transmitted from the transmitting terminal and passing through the multipath channel 160, and aligns the blocks in parallel. The CP removing unit 180 removes the CP that is inserted through the CP inserting unit 140 of the transmitting terminal from the OFDM signals of a time domain aligned in parallel. The FFT converter 190 converts the OFDM signals in the time domain into the OFDM signal in the frequency domain. Further, the receiving unit further includes the channel estimating unit 200, the signal correcting unit 210, the second parallel-to-serial converter 220, and the signal demapping unit 230. The channel estimating unit 200 estimates a channel coefficient value by using the pilot signal in the frequency domain. The signal correcting unit 210 compensates for an abnormal distortion by using the channel coefficient value estimated by the channel estimating unit 200. The second parallel-to-serial converter 220 aligns signals of the frequency domain, whose distortion has been compensated for, in an inverse order of a transmission order. The signal demapping unit 230 performs demapping on the signals of the frequency domain and generates output data.

The signal mapping unit 100 of the apparatus for estimating a channel according to the exemplary embodiment of the present invention maps a binary data signal input to the transmitting terminal by using a common quadrature amplitude modulation (QAM) method. At this time, the QAM method may be any one of a quaternary phase shift keying (QPSK) method, a 16-QAM method, or a 64-QAM modulation method.

The signal, which has been mapped by using any one of the mapping methods in the signal mapping unit 100, is converted in parallel by the first serial-to-parallel converter 110. Then, a pilot is inserted into each OFDM symbol at a predetermined interval in the pilot inserting unit 120, in a method shown in FIG. 1. In this case, the interval at which the pilots are inserted is adjusted according to a channel environment where the orthogonal frequency division multiplexing mobile communication system is used.

Each OFDM symbol data that includes a pilot is subjected to an inverse Fourier transform by the IFFT converter 130. In the first parallel-to-serial converter 150, in order to transmit the signal, each OFDM symbol data is converted into a signal having a serial form and then output. The output signal passes through the multipath channel 160 and is then transmitted to the receiving terminal.

In the signal that has been transmitted by the transmitting terminal having the above-described structure, a distortion occurs through the multipath channel 160, and the distorted signal is received by the receiving terminal.

The received signal is converted into a parallel signal by the second serial-to-parallel converter 170 of the receiving terminal. The CP of the received signal is removed by the CP removing unit 180, and the received signal is input to the FFT converter 190. The signal, which has been subjected to a Fourier transform by the FFT converter 190, is input to the signal correcting unit 210. The signal correcting unit 210 compensates for an abnormal distortion that occurs due to neighboring channel interference or multipath fading in the multipath channel 160, by using the channel coefficient value that is estimated by the channel estimating unit 200.

In this case, when calculating the filter coefficient that is represented by Equation 7 on the basis of the Wiener FIR filtering estimation method, the channel estimating unit 200 applies values, which are calculated in advance for delay spread values in three steps (for example, small, middle, and large), to the filter coefficients and stores them in memories in advance. The channel estimating unit 200 estimates a delay spread value of the channel, which varies when a moving body moves. At this time, the filter coefficients, which are stored according to the estimated delay spread values of the three steps, are used as the Wiener FIR filter coefficients so as to be used when estimating the channel.

The signal that has passed through the signal correcting unit 210 is converted into a signal having a serial form in the second parallel-to-serial converter 220, and is output as a signal in a form of binary data that has been originally transmitted from the signal demapping unit 230.

The detailed structure of the channel estimating unit according to the exemplary embodiment of the present invention will be described in detail with reference to FIG. 5.

Figure 5:
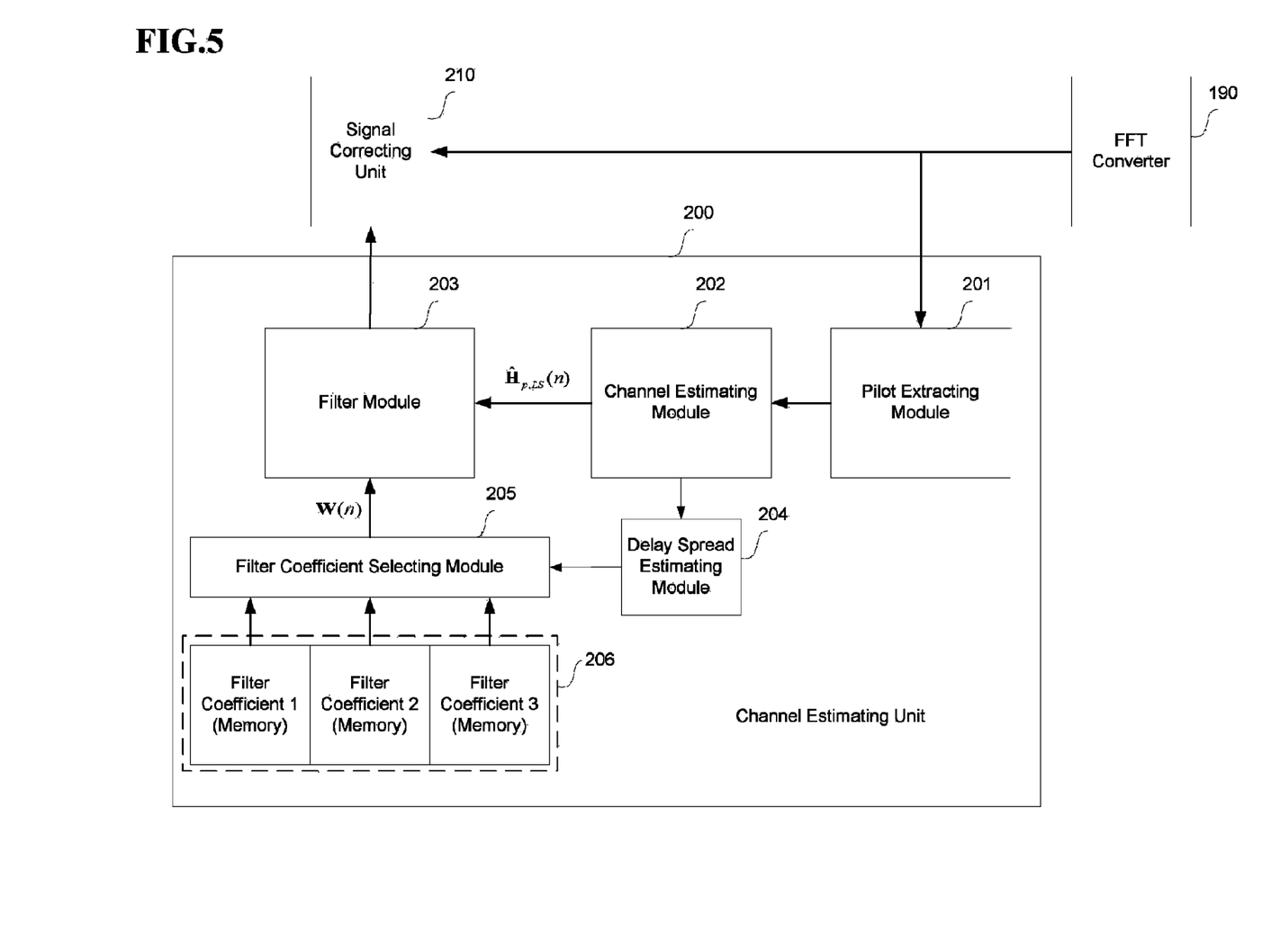
FIG. 5 is a configuration diagram illustrating a detail block of a channel estimating unit according to an exemplary embodiment of the present invention.

FIG. 5 is a configuration diagram illustrating a detailed block of a channel estimating unit according to an exemplary embodiment of the present invention.

As shown in FIG. 5, the channel estimating unit 200 according to the exemplary embodiment of the present invention includes a pilot extracting module 201, a channel estimating module 202, a filter module 203, a delay spread estimating module 204, a filter coefficient selecting module 205, and a filter coefficient storage module 206.

The pilot extracting module 201 receives the signals that have been subjected to a Fourier transform by the FFT converter 190. The pilot extracting module 201 only extracts pilot signals from among the received signals and outputs them.

The channel estimating module 202 receives the pilot signals that are output by the pilot extracting module 201 and outputs them as a column $\hat{H}_{p,LS}$ of channel estimation values for the pilot signals. The column of channel estimation values includes a plurality of channel estimation values. At this time, using Equation 1 described above, the column $\hat{H}_{p,LS}$ of channel estimation values for the pilot signals is output. The output column of channel estimation values is divided into pilot signal columns during a sliding window that includes Ntap pilots, which is obtained by sliding the window, and is then output.

The filter module 203 receives the column of channel estimation values that has been divided into the pilot signal columns during the sliding window output by the channel estimating module 202, and extracts a channel estimation value on the basis of a plurality of filter coefficients. In this case, the plurality of filter coefficients are input from the filter coefficient selecting module 205, which will be described below. At this time, the channel estimation value that is output by the filter module 203 becomes a channel estimation value for an entire OFDM symbol.

The delay spread estimating module 204 receives the column of channel estimation values that is output from the channel estimating module 202 and estimates a delay spread value. The estimated delay spread value is configured in the form of a sum between a channel value as a signal component and a white Gaussian noise as a noise component. As described above, in the exemplary embodiment of the present invention, only the values of the three steps (e.g., small, middle, and large) may be estimated. Accordingly, the delay spread estimating module 204 can be implemented by using a simple algorithm.

The filter coefficient selecting module 205 performs a function of outputting the plurality of filter coefficients that are input to the filter module 203. That is, the filter coefficient selecting module 205 selects any one of filter coefficients 1 to 3 according to the delay spread value estimated by the delay spread estimating module 204, and outputs it to the filter module 203. In the exemplary embodiment of the present invention, the three filter coefficients are used, but the present invention is not limited thereto. Further, in the filter coefficient, a delay amount of the signal is changed according to the radius of the cell. Accordingly, since the delay coefficient is also changed, the three steps of the delay spread are set by a designer of the system.

The filter coefficient storage module 206 stores the filter coefficients that have been calculated in advance, and the number of filter coefficient storage modules is changed according to the number of filter coefficients. In this case, the filter coefficients are calculated in advance by using Equations 4, 5, and 7.

Next, a method of estimating a channel using the apparatus for estimating a channel will be described with reference to FIG. 6.

Figure 6:
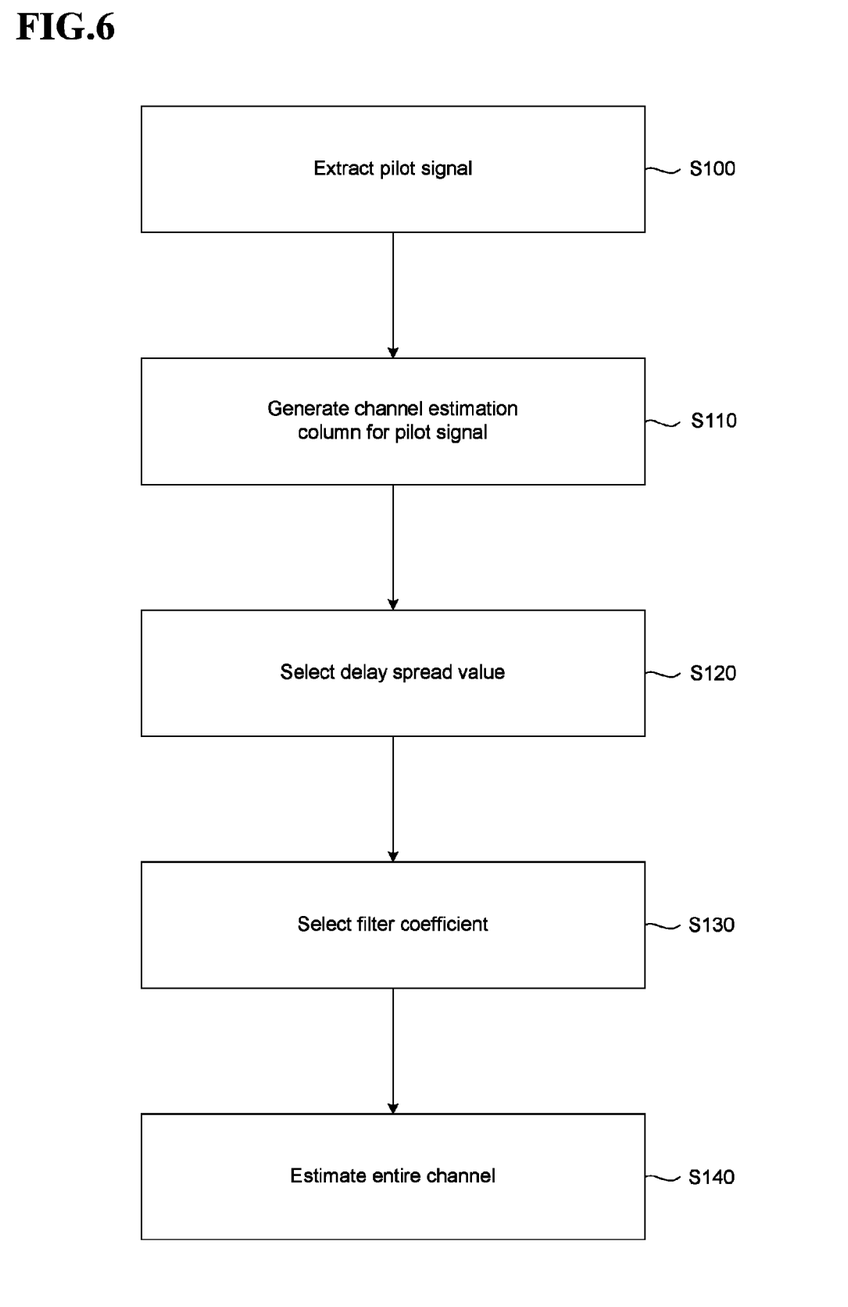
FIG. 6 is a flowchart illustrating a method of estimating a channel according to an exemplary embodiment of the present invention.

FIG. 6 is a flowchart illustrating a method of estimating a channel according to an exemplary embodiment of the present invention.

As shown in FIG. 6, the pilot extracting module 201 receives the signals having been subjected to a Fourier transform by the FFT converter 190. The pilot extracting module 201 extracts the pilot signals from the received signals (Step S100). Then, the channel extracting module 202 which has received the extracted pilot signals, outputs the column of channel estimation values for the pilot signal through the channel estimation (Step S110). In this case, the channel estimating module 202 outputs the column value of the channel estimation values using an LS channel estimation method.

The output column value of the channel estimation values is input to the filter module 203. The filter module 203 estimates a channel for an entire OFDM symbol on the basis of the input column value of the channel estimation values, and outputs the estimated channel to the signal correcting unit 210 (Step S140). In this case, in order that the filter module 203 estimates an entire channel for the OFDM symbol, the filter module 203 receives the filter coefficient selected by the filter coefficient selecting module 205 and estimates the channel.

That is, the column value of the channel estimation values that is estimated by the channel estimating module 202 is transmitted to the delay spread estimating module 204. The delay spread estimating module 204 selects any one of delay spread values set by a user when designing a system, that is, values of three steps, which corresponds to the column values of the channel estimation values (Step S120), and transmits it to the filter coefficient selecting module 205 (Step S110). The filter coefficient selecting module 205 selects a filter coefficient that corresponds to the channel delay spread estimation value received from the delay spread estimating module 204 (Step S130). Then, the filter coefficient selecting module 205 receives the corresponding filter coefficient value from the filter coefficient storage module 206 and transmits it to the filter module 203.

As described above, the filter module 203 estimates a channel for an entire OFDM symbol on the basis of the column value of the channel estimation values and the filter coefficient value, and transmits the estimated result to the signal correcting unit 210 (Step S140). If using the above-described processes, the channel estimating unit 200 uses the previously stored filter coefficients without calculating the filter coefficient values whenever the channel is estimated. Therefore, it is possible to reduce the amount of calculation needed at the time of the filter calculation. Further, since the filter coefficient can be changed according to the delay spread value of the channel, it is possible to accurately estimate a channel so as to be adaptive for a temporal change of the channel.

In this case a program that realizes a function corresponding to the structure according to the exemplary embodiment of the present invention and a recording medium that has recorded the program therein are within the range of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the above-described exemplary embodiment, if the coefficient of the Wiener FIR filter is changed according to the delay spread value of the channel, it is possible to estimate the channel to be adaptive for the temporal change of the channel.

Further, since the previously calculated filter coefficients are used, it is possible to reduce the amount of calculation needed when calculating the filter coefficients.

What is claimed is:

1. An apparatus for estimating a channel based on a channel delay spread, the apparatus comprising:
   a Fast Fourier Transform (FFT) converter for performing a Fourier transform on a signal where distortion has occurred;
   a channel estimating unit for estimating delay spread values, in a form of a sum between a channel value as a signal component and a white Gaussian noise as a noise component, on a basis of a plurality of channel estimation values corresponding to pilot signals only extracted from the signal on which the Fourier transform has been performed, for outputting a channel estimation value of an entire symbol for the signals where the distortion has occurred by using a column of the channel estimation values estimated for the pilot signals and Wiener Finite Impulse Response (FIR) filter coefficients that are calculated in advance to correspond to the estimated delay spread values, and for selecting the Wiener FIR filter coefficients from a predetermined plurality of Wiener FIR filter coefficients on a basis of a maximum of the estimated delay spread values; and
   a signal correcting unit for compensating for the distortion of the signal on a basis of the channel estimation value of the entire symbol, which is estimated for the signal where the distortion has occurred, and outputs the signals.

2. The apparatus of claim 1, wherein the channel estimating unit includes:
   a pilot extracting module for receiving the signals on which the Fourier transform has been performed and for extracting the pilot signals from the signals;
   a channel estimating module for outputting the column of the channel estimation values for the extracted pilot signals;
   a delay spread estimating module for estimating delay spread values on the basis of the column of the channel estimation values and for outputting the delay spread values;
   a filter coefficient selecting module for selecting the filter coefficients, which are calculated in advance on the basis of the delay spread values; and
   a filter module for collecting a plurality of channel estimation values on a basis of the output column of channel estimation values and the selected filter coefficients, and for outputting the channel estimation value for the entire symbol.

3. The apparatus of claim 2, further comprising:
   a filter coefficient storage module for storing filter coefficient values that are calculated in advance to correspond to the filter coefficients selected by the filter coefficient selecting module.

4. The apparatus of claim 2, wherein the channel estimating module estimates a channel including the pilot signal based on information on a transmitted pilot vector, a received pilot vector, and an interval between the pilot subcarriers.

5. The apparatus of claim 3, wherein the channel estimating module uses a Least Square (LS) channel estimation method.

6. A method of estimating a channel corresponding to a channel delay spread, the method comprising:
   receiving signals where distortion has occurred;
   extracting only pilot signals from the received signals;
   estimating a plurality of channel estimation values corresponding to the extracted pilot signals;
   estimating channel delay spread values in a form of a sum between a channel value as a signal component and a white Gaussian noise as a noise component from the extracted pilot signals;
   selecting filter coefficients from a plurality of Wiener Finite Impulse Response (FIR) filter coefficients calculated in advance on a basis of a maximum of the estimated channel delay spread values; and
   estimating channels for an entire symbol of the signals where the distortion occurred on a basis of the selected filter coefficients and the channel estimation values corresponding to the pilot signals,
   wherein the estimating of the channel delay spread values includes:
      estimating channels for the extracted pilot signals and outputting a column of channel estimation values; and
      estimating the channel delay spread values on a basis of the output column of channel estimation values.

7. The method of claim 6, wherein the channel delay spread values are estimated on a basis of a correlation between a first subcarrier channel and a second subcarrier channel, a maximum delay spread value, an FFT point, and a channel value.

8. The method of claim 6, wherein the column of channel estimation values, which includes a plurality of channel estimation values, is divided by a sliding window and the channels are estimated on a basis of the channel estimation values.

9. The method of claim 6, wherein the filter coefficients are calculated on a basis of a cross-correlation function between a channel matrix value and an estimated channel vector of a pilot in a window that is used to obtain a channel estimation value for a subcarrier, and an auto-correlation function of an actual channel in the pilot.

* * * * *